(12) United States Patent
Akiba et al.

(10) Patent No.: US 11,784,335 B2
(45) Date of Patent: Oct. 10, 2023

(54) HYDROGEN-ENERGY CONTROL SYSTEM AND CONTROL METHOD FOR HYDROGEN-ENERGY CONTROL SYSTEM

(71) Applicant: TOSHIBA ENERGY SYSTEMS & SOLUTIONS CORPORATION, Kawasaki (JP)

(72) Inventors: Takashi Akiba, Kawasaki Kanagawa (JP); Fumiyuki Yamane, Kawasaki Kanagawa (JP); Shin Kato, Yokohama Kanagawa (JP); Hirofumi Morita, Kawasaki Kanagawa (JP); Tetsuharu Tanoue, Tokyo (JP)

(73) Assignee: Toshiba Energy Systems & Solutions Corporation, Kawasaki (JP)

( * ) Notice: Subject to any disclaimer, the term of this patent is extended or adjusted under 35 U.S.C. 154(b) by 315 days.

(21) Appl. No.: 17/345,924

(22) Filed: Jun. 11, 2021

(65) Prior Publication Data

US 2021/0305605 A1 Sep. 30, 2021

Related U.S. Application Data

(63) Continuation of application No. PCT/JP2018/045709, filed on Dec. 12, 2018.

(51) Int. Cl.
*H01M 8/04* (2016.01)
*H02J 13/00* (2006.01)
(Continued)

(52) U.S. Cl.
CPC ........ *H01M 8/04925* (2013.01); *G05B 15/02* (2013.01); *H01M 8/04201* (2013.01);
(Continued)

(58) Field of Classification Search
None
See application file for complete search history.

(56) References Cited

U.S. PATENT DOCUMENTS 7,444,189 B1 10/2008 Marhoefer
7,527,660 B2 5/2009 Noujima et al.
(Continued)

FOREIGN PATENT DOCUMENTS

JP 2002-95167 3/2002
JP 2002-372199 A1 12/2002
(Continued)

OTHER PUBLICATIONS

Cecilia et al., "Optimal Energy Management in a Standalone Microgrid, with Photovoltaic Generation, Short-Term Storage, and Hydrogen Production", Feb. 2020, Energies 2020, 13, 1454. (Year: 2020).*

(Continued)

*Primary Examiner* — Mohammad Ali
*Assistant Examiner* — Kelvin Booker
(74) *Attorney, Agent, or Firm* — Finnegan, Henderson, Farabow, Garrett & Dunner, LLP

(57) ABSTRACT

A hydrogen-energy control system according to the present embodiment includes a hydrogen energy system, a power grid control system, a hydrogen transport system, and a hydrogen-energy integrated management system configured to control the hydrogen energy system based on information on communication with the power grid control system, wherein the hydrogen-energy integrated management system includes a first communication portion configured to perform communication of at least data of a charge request in charge and discharge requests with the power grid control system, a second communication portion configured to perform communication of hydrogen demand data with the
(Continued)

hydrogen transport system, a target hydrogen-amount acquisition portion configured to acquire a target hydrogen-production amount based on the hydrogen demand data, and an operation planning portion configured to create an operation plan in the hydrogen energy system based on the target hydrogen-production amount and the data of the charge request.

14 Claims, 19 Drawing Sheets

(51) Int. Cl.
| | |
|---|---|
| G05B 15/02 | (2006.01) |
| H01M 16/00 | (2006.01) |
| H01M 8/04858 | (2016.01) |
| H01M 8/04082 | (2016.01) |
| H01M 8/04298 | (2016.01) |
| H01M 8/04746 | (2016.01) |

(52) U.S. Cl.
CPC ... *H01M 8/04305* (2013.01); *H01M 8/04753* (2013.01); *H01M 16/006* (2013.01); *H02J 13/00001* (2020.01); *H02J 13/00002* (2020.01); *H01M 2250/10* (2013.01); *H01M 2250/402* (2013.01)

(56) References Cited

U.S. PATENT DOCUMENTS

| | | | |
|---|---|---|---|
| 8,394,543 B2 | 3/2013 | Suyama et al. | |
| 2004/0131508 A1* | 7/2004 | Fairlie | C01B 3/36 |
| | | | 422/112 |
| 2004/0202914 A1* | 10/2004 | Sridhar | C01B 3/34 |
| | | | 429/411 |
| 2004/0205032 A1* | 10/2004 | Routtenberg | B60L 58/30 |
| | | | 429/430 |
| 2005/0165511 A1 | 7/2005 | Fairlie | |
| 2006/0229827 A1* | 10/2006 | Copeman | C01B 3/00 |
| | | | 702/24 |
| 2007/0179672 A1* | 8/2007 | Fairlie | C01B 3/02 |
| | | | 700/266 |
| 2008/0121525 A1* | 5/2008 | Doland | F03B 13/00 |
| | | | 322/29 |
| 2008/0127646 A1* | 6/2008 | Doland | F03D 9/19 |
| | | | 60/495 |
| 2008/0236647 A1* | 10/2008 | Gibson | H02J 3/381 |
| | | | 136/244 |
| 2013/0093194 A1* | 4/2013 | Barbachano | H02J 15/008 |
| | | | 290/55 |
| 2018/0209306 A1* | 7/2018 | Heid | F01K 13/00 |
| 2018/0269515 A1* | 9/2018 | Wang | H01M 8/04925 |
| 2018/0269516 A1* | 9/2018 | Wang | H01M 8/186 |
| 2018/0287387 A1 | 10/2018 | Lansing, Jr. et al. | |
| 2021/0305606 A1* | 9/2021 | Murai | H01M 8/0631 |
| 2021/0359519 A1* | 11/2021 | Tamaru | H02J 3/28 |
| 2021/0381120 A1* | 12/2021 | Akiba | H02J 3/381 |

FOREIGN PATENT DOCUMENTS

| | | |
|---|---|---|
| JP | 2004-355838 A | 12/2004 |
| JP | 2005-350299 A | 12/2005 |
| JP | 3801898 B2 | 7/2006 |
| JP | 2011-182516 A | 9/2011 |
| JP | 5306621 B2 | 10/2013 |
| JP | 5498191 B2 | 5/2014 |
| JP | 2017-76611 A | 4/2017 |
| JP | 6441542 B2 | 12/2018 |
| JP | 6564131 B2 | 8/2019 |
| WO | WO 03/107508 A2 | 12/2003 |
| WO | WO 2016/075770 A1 | 5/2016 |
| WO | WO 2017/158762 A1 | 9/2017 |
| WO | WO 2018/078875 A1 | 5/2018 |

OTHER PUBLICATIONS

Khalid et al., "Analysis and assessment of an integrated hydrogen energy system", Jul. 2015, international journal of hydrogen energy 41 (2016) 7960-7967. (Year: 2015).*

Melo et al., "Synergistic Control Between Hydrogen Storage System and Offshore Wind Farm for Grid Operation", Jan. 2014, IEEE Transactions on Sustainable Energy, vol. 5, No. 1, Jan. 2014. (Year: 2014).*

Petrollese, "Real-time integration of optimal generation scheduling with MPC for the energy management of a renewable hydrogen-based microgrid", Oct. 2015, Applied Energy 166 (2016) 96-106. (Year: 2015).*

* cited by examiner

IMPORTANCE OF DISCHARGE TIME SLOT

| START TIME | END TIME | IMPORTANCE |
|---|---|---|
| 8:00 | 9:59 | C |
| 10:00 | 11:59 | A |
| 17:00 | 18:59 | B |

FIG. 5A

IMPORTANCE OF CHARGE TIME SLOT

| START TIME | END TIME | IMPORTANCE |
|---|---|---|
| 13:00 | 15:59 | A |
| 16:00 | 16:59 | C |

FIG. 5B

IMPORTANCE OF CONSTRAINT RELATED TO DISCHARGING AND CHARGING

| CONSTRAINT | IMPORTANCE |
|---|---|
| DISCHARGEABLE TIME SLOT | 100 |
| DISCHARGEABLE POWER AMOUNT | 20 |
| DISCHARGEABLE TIME SLOT | 1 |
| DISCHARGEABLE POWER AMOUNT | 2 |

FIG. 5C

| ITEM | VALUE |
|---|---|
| ① MAXIMUM OUTPUT [kW] | 10000 |
| ② MINIMUM OUTPUT [kW] | 5000 |
| ③ PRE-DISCHARGE MINIMUM KEEP TIME [MIN] | 30 |
| ④ DISCHARGE MINIMUM KEEP TIME [MIN] | 0 |
| ⑤ UPPER LIMIT OF DISCHARGE-POWER CHANGE RATE [kW/MIN] | 1000 |
| ⑥ LOWER LIMIT OF DISCHARGE-POWER CHANGE RATE [kW/MIN] | 1000 |
| ⑦ POST-DISCHARGE MINIMUM KEEP TIME [MIN] | 30 |
| ⑧ DISCHARGEABLE TIME SLOT [H/MIN - H/MIN] | 8:00～9:59 |
| ⑨ DISCHARGEABLE POWER AMOUNT [MWh] | 10000 |

FIG. 8

| ITEM | VALUE |
| --- | --- |
| ① MAXIMUM INPUT [kW] | 10000 |
| ② MINIMUM INPUT [kW] | 5000 |
| ③ PRE-CHARGE MINIMUM KEEP TIME [MIN] | 30 |
| ④ CHARGE MINIMUM KEEP TIME [MIN] | 0 |
| ⑤ LOWER LIMIT OF CHARGE-POWER CHANGE RATE [kW/MIN] | 1000 |
| ⑥ UPPER LIMIT OF CHARGE-POWER CHANGE RATE [kW/MIN] | 1000 |
| ⑦ POST-CHARGE MINIMUM KEEP TIME [MIN] | 30 |
| ⑧ CHARGEABLE TIME SLOT [H/MIN - H/MIN] | 11:00~14:59 |
| ⑨ CHARGEABLE POWER AMOUNT [MWh] | 30000 |

FIG.10

| START TIME | END TIME | POWER (+DISCHARGING, - CHARGING) [MW] |
| --- | --- | --- |
| 10:00 | 10:59 | 10 |
| 11:00 | 11:59 | 5 |
| 13:00 | 13:59 | -8 (FIRST CHARGE REQUEST) |
| 14:00 | 14:30 | -3 (SECOND CHARGE REQUEST) |

FIG.11

| START TIME | END TIME | POWER GENERATION AMOUNT [MWh] |
|---|---|---|
| 00:00 | 00:29 | 0 |
| 00:30 | 00:59 | 0 |
| 01:00 | 01:29 | 0 |
| 01:30 | 01:59 | 0 |
| ... | | |
| 12:00 | 12:29 | 100 |
| 12:30 | 12:59 | 120 |
| ... | | |
| 21:00 | 21:29 | 0 |
| 21:30 | 21:59 | 0 |
| 22:00 | 22:29 | 0 |
| 22:30 | 22:59 | 0 |
| 23:00 | 23:29 | 0 |
| 23:30 | 23:59 | 0 |

FIG.12

| START TIME | END TIME | RESULT | POWER UNABLE TO BE RESPONDED (+DISCHARGING, -CHARGING) [MW] |
|---|---|---|---|
| 10:00 | 10:59 | OK | - |
| 11:00 | 11:59 | NG | 2 |
| 13:00 | 13:59 | OK | - |
| 14:00 | 14:30 | NG | -1 |

FIG.13

| START TIME | END TIME | POWER (+ DISCHARGING) [MW] |
|---|---|---|
| 10:00 | 10:59 | 10 |
| 11:00 | 11:59 | 5 |

FIG.16A

| START TIME | END TIME | POWER (CHARGING) [MW] |
|---|---|---|
| 13:00 | 13:59 | -8 |
| 14:00 | 14:30 | -3 |

FIG.16B

| ACTIVE POWER [MW] | REACTIVE POWER [Mvar] |
|---|---|
| 5 | 5 |

FIG.16C

| POWER FACTOR [%] | REACTIVE POWER [Mvar] |
|---|---|
| 85.5以上 | 5 |

FIG.16D

| POWER (+DISCHARGING, - CHARGING) [MW] |
|---|
| 10 |

FIG.16E

HYDROGEN-ENERGY CONTROL SYSTEM AND CONTROL METHOD FOR HYDROGEN-ENERGY CONTROL SYSTEM

CROSS-REFERENCE TO RELATED APPLICATIONS

This application is a continuation application of International Application No. PCT/JP2018/045709, filed Dec. 12, 2018. The contents of this application is incorporated herein by reference in their entirety.

FIELD

Embodiments of the present invention relate to a hydrogen-energy control system and a control method for a hydrogen-energy control system.

BACKGROUND

Hydrogen energy is attracting attention as new energy. Hydrogen is produced by a hydrogen production device of a hydrogen system and stored in a hydrogen tank. The hydrogen stored in the hydrogen tank can be reconverted into power by a hydrogen power generator. Therefore, by connecting the devices in a hydrogen system to a power grid, it is possible to both supply power from the power grid and supply power to the power grid. An example of the hydrogen power generator is a fuel cell. In this manner, it is possible to stabilize the power grid and respond to hydrogen demand by the hydrogen system.

Further, in the future, demand for hydrogen itself is also expected to increase because of increase in fuel cell vehicles using hydrogen as fuel and increase in pure hydrogen fuel cells for home use. In this case, hydrogen is transported or sent by a pipeline. Therefore, efficient energy management of hydrogen and power is required.

However, when management of the power grid, management of the hydrogen demand, and management of the hydrogen system are performed by one management control system, there is a possibility that processing becomes complicated.

An object of the present invention is to provide a hydrogen-energy control system capable of adjusting independent request processes of a power grid control system and a hydrogen transport system in accordance with an operation plan of a hydrogen energy system.

BRIEF DESCRIPTION OF THE DRAWINGS

FIG. 5A is a diagram illustrating importance of a discharge time slot in parameters for constraint calculation.

FIG. 5B is a diagram illustrating importance of a charge time slot in the parameters for constraint calculation.

FIG. 5C is a diagram illustrating importance of a constraint related to discharging and charging.

FIG. 8 is a diagram illustrating numerical value examples of a constraint condition used in FIG. 7.

FIG. 10 is a diagram illustrating numerical value examples of a constraint condition used in FIG. 9.

FIG. 11 is a diagram illustrating an example of charge and discharge requests from a power grid control system.

FIG. 12 is a diagram illustrating an example of data of forecast results of renewable-energy power generation.

FIG. 13 is a diagram illustrating an example of an answerback (OK/NG).

FIG. 16A is a diagram illustrating an example of a real-time discharge request.

FIG. 16B is a diagram illustrating an example of a real-time charge request.

FIG. 16C is a diagram illustrating an example of a reactive power request of a real-time short-period power request.

FIG. 16D is a diagram illustrating a different example of a reactive power request.

FIG. 16E is a diagram illustrating an example of an LFC (load frequency control) request of a real-time short-period power request.

DETAILED DESCRIPTION

Figure 1:
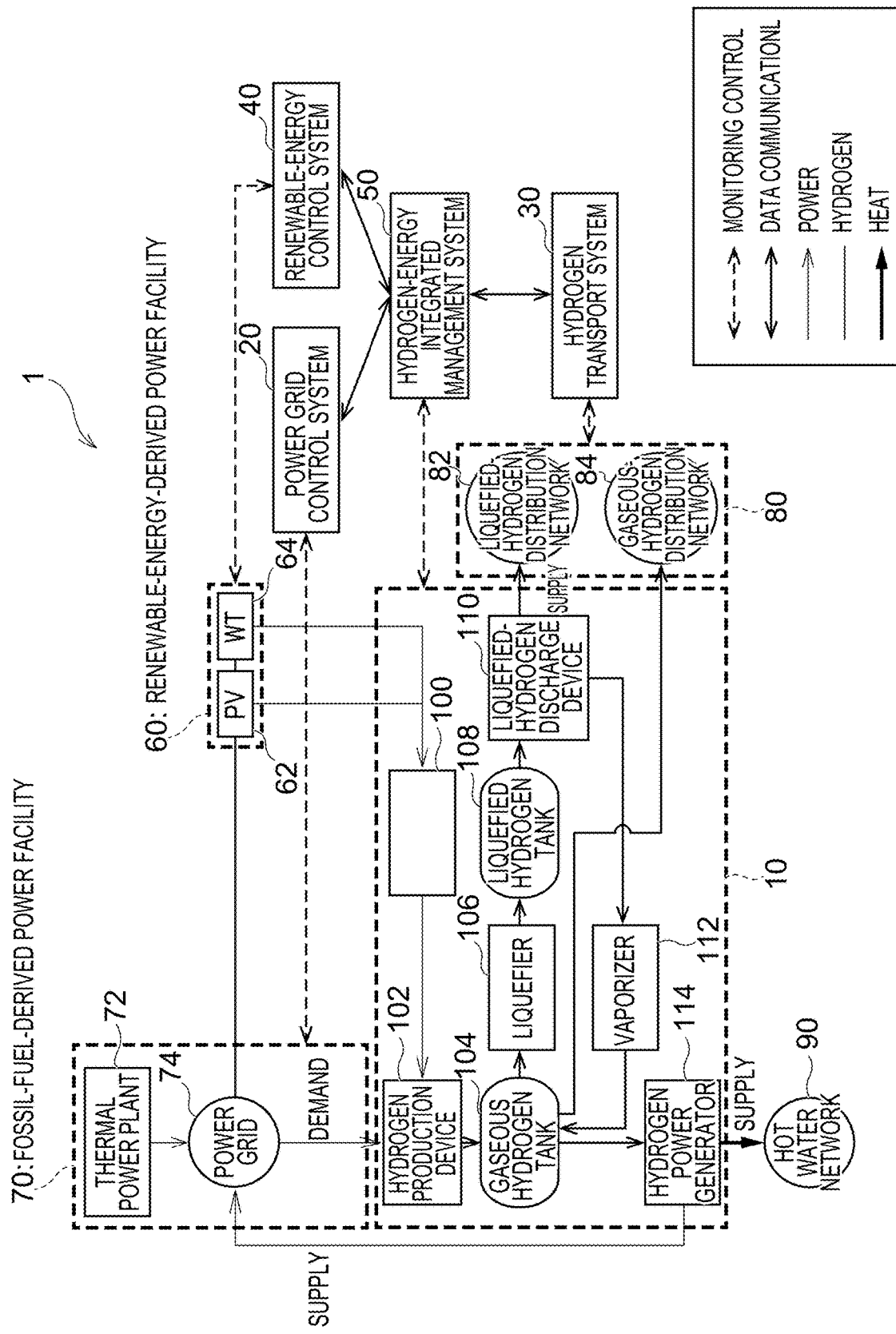
FIG. 1 is a block diagram illustrating a configuration of a hydrogen-energy control system.

A hydrogen-energy control system according to the present embodiment comprises: a hydrogen energy system configured to produce at least hydrogen by power; a power grid control system configured to make a power generation plan of a power facility that supplies power to a power grid; a hydrogen transport system configured to manage hydrogen transport; and a hydrogen-energy integrated management system configured to control the hydrogen energy system based on the power grid control system and information on communication with the power grid control system, wherein the hydrogen-energy integrated management system includes a first communication portion configured to perform communication of at least data of a charge request in charge and discharge requests with the power grid control system, a second communication portion configured to perform communication of hydrogen demand data with the hydrogen transport system, a target hydrogen-amount acquisition portion configured to acquire a target hydrogen-production amount based on the hydrogen demand data, and an operation planning portion configured to create an operation plan in the hydrogen energy system based on the target hydrogen-production amount and the data of the charge request.

According to the present embodiment, it is possible to adjust independent request processes of a power grid control system and a hydrogen transport system.

A hydrogen-energy control system and a control method for a hydrogen-energy control system according to embodiments of the present invention will now be explained in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

Embodiment

FIG. 1 is a block diagram illustrating a configuration of a hydrogen-energy control system 1 according to an embodiment. As illustrated in FIG. 1, the hydrogen energy system 1 according to the present embodiment is configured to include a hydrogen energy system 10, a power grid control system 20, a hydrogen transport system 30, a renewable-energy control system 40, a hydrogen-energy integrated management system 50, a renewable-energy-derived power facility 60. Further, a fossil-fuel-derived power facility 70, a hydrogen distribution network 80, and a hot water network 90 are illustrated in FIG. 1.

The hydrogen energy system 10 produces at least hydrogen by power. A detailed configuration of the hydrogen energy system 10 will be described later.

The power grid control system 20 makes a power generation plan of a power facility that supplies power to a power grid 74, for example, a thermal power plant 72. The power grid control system 20 performs communication of at least data of a charge request in charge and discharge requests with the hydrogen-energy integrated management system 50.

The hydrogen transport system 30 manages hydrogen transport. The hydrogen transport system 30 performs communication of hydrogen demand data with the hydrogen-energy integrated management system 50.

The renewable-energy control system 40 controls the renewable-energy-derived power facility 60. The renewable-energy control system 40 performs communication of data of a forecast result of renewable-energy power generation with the hydrogen-energy integrated management system 50.

The hydrogen-energy integrated management system 50 controls the hydrogen energy system 10 based on information on communication with the power grid control system 20, the hydrogen transport system 30, and the renewable-energy control system 40. A detailed configuration of the hydrogen-energy integrated management system 50 will be described later.

The renewable-energy-derived power facility 60 includes a natural energy-derived power facility. This renewable-energy-derived power facility 60 includes a photovoltaic power generator 62 using sunlight and a wind power generator 64 that generates power using wind. This renewable-energy-derived power facility 60 does not require fuel such as fossil fuel, but the amount of power generated is unstable because of environmental influences such as the weather and wind power. The renewable-energy-derived power facility 60 may be a power facility that uses new energy such as biomass or biomass-derived waste.

The fossil-fuel-derived power facility 70 includes the thermal power plant 72 and the power grid 74. The thermal power plant 72 generates power using fossil fuel. The power grid 74 is a power grid to which the renewable-energy-derived power facility 60, the fossil-fuel-derived power facility 70, and a hydrogen power generator 114 are connected and to which power generated by the renewable-energy-derived power facility 60, the fossil-fuel-derived power facility 70, and the hydrogen power generator 114 is supplied.

The hydrogen distribution network 80 includes a liquefied-hydrogen distribution network 82 and a gaseous-hydrogen distribution network 84. The liquefied-hydrogen distribution network 82 is a distribution network that transports hydrogen as a liquid and supplies it to hydrogen demand. The gaseous-hydrogen distribution network 84 is a distribution network that transports hydrogen as a gas and supplies it to hydrogen demand.

Here, a detailed configuration of the hydrogen energy system 10 is described. The hydrogen energy system 10 is configured to include a power conditioner device 100, a hydrogen production device 102, a gaseous hydrogen tank 104, a liquefier 106, a liquefied hydrogen tank 108, a liquefied-hydrogen discharge device 110, a vaporizer 112, and the hydrogen power generator 114.

The power conditioner device 100 is configured to include a converter, for example. The converter converts direct-current power output from the renewable-energy-derived power facility 60 into predetermined alternating-current power.

The hydrogen production device 102 produces hydrogen from electricity and water by water electrolysis. That is, the hydrogen production device 102 produces hydrogen by electrolysis of water using power supplied from at least either one of the renewable-energy-derived power facility 60 or the power grid 74, and stores the produced hydrogen in the gaseous hydrogen tank 104. The hydrogen production device 102 is, for example, a water electrolysis device that produces hydrogen and oxygen by causing an electric current to pass through an alkaline solution. Further, the hydrogen production device 102 stores the produced hydrogen in the gaseous hydrogen tank 104 via a hydrogen pipe.

The gaseous hydrogen tank 104 stores therein the gaseous hydrogen produced by the hydrogen production device 102. The gaseous hydrogen tank 104 is connected to the hydrogen production device 102, the liquefier 106, and the gaseous-hydrogen distribution network 6. The gaseous hydrogen tank 104 also supplies the gaseous hydrogen to the liquefier 106 and the gaseous-hydrogen distribution network 84.

The liquefier 106 converts the gaseous hydrogen supplied from the gaseous hydrogen tank 104 into liquefied hydrogen. The liquefier 106 converts the hydrogen supplied from the gaseous hydrogen tank 104 into liquefied hydrogen and supplies the liquefied hydrogen to the liquefied hydrogen tank 108 via a pipe.

The liquefied hydrogen tank 108 stores therein the liquefied hydrogen supplied from the liquefier 106. The liquefied hydrogen tank 108 stores therein the liquefied hydrogen supplied from the liquefier 106 and also supplies the liquefied hydrogen to the liquefied-hydrogen discharge device 110 via a pipe.

The liquefied-hydrogen discharge device 110 supplies the liquefied hydrogen supplied from the liquefied hydrogen tank 108 to the liquefied-hydrogen distribution network 82 and the vaporizer 112. The liquefied-hydrogen discharge device 110 may be configured to be integrated with the liquefied hydrogen tank 108.

The vaporizer 112 converts the liquefied hydrogen supplied from the liquefied-hydrogen discharge device 110 into gaseous hydrogen. That is, the vaporizer 112 converts the liquefied hydrogen supplied from the liquefied-hydrogen discharge device 110 into gaseous hydrogen and supplies the gaseous hydrogen to the gaseous hydrogen tank 104 via a pipe.

The hydrogen power generator 114 generates power and heat using the hydrogen supplied from the gaseous hydrogen tank 104. The heat generated here is supplied to the hot water network 90 as hot water, for example. The hydrogen power generator 114 includes, for example, a fuel cell. That is, the hydrogen power generator 114 generates electricity using the hydrogen supplied from the gaseous hydrogen tank 104 and also generates heat. As for oxygen, the hydrogen power generator 114 may use oxygen in the air or oxygen that is produced in association with production of hydrogen by the hydrogen production device 102 and is stored in an oxygen tank.

Figure 2:
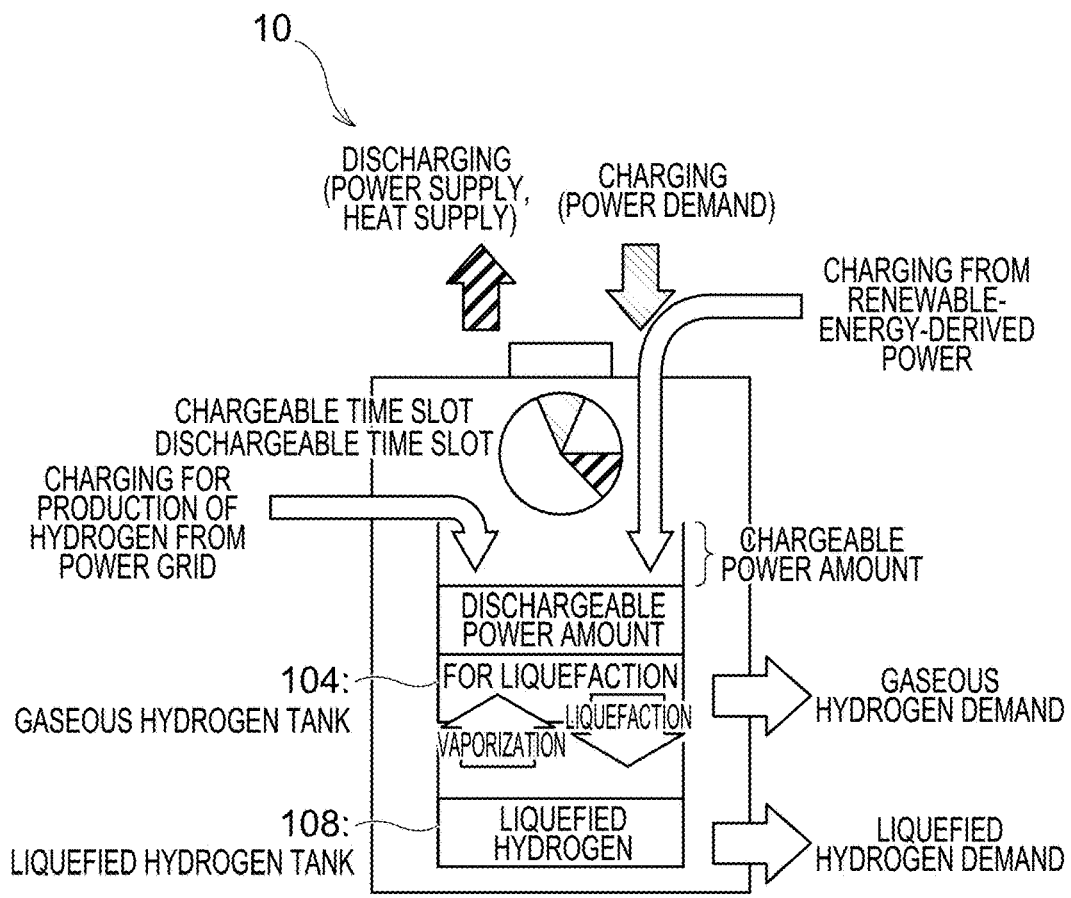
FIG. 2 is a conceptual diagram illustrating a configuration of a hydrogen energy system as a battery.

FIG. 2 is a conceptual diagram illustrating a configuration of the hydrogen energy system 10 as a battery. As illustrated in FIG. 2, the hydrogen energy system 10 performs charging by producing hydrogen using power supplied from the renewable-energy-derived power facility 60 and the fossil-fuel-derived power facility 70. That is, charging of the hydrogen energy system 10 according to the present embodiment means converting power into gaseous hydrogen. A chargeable power amount depends on the free capacity of the gaseous hydrogen tank 104.

Meanwhile, a dischargeable power amount depends on the storage capacities of the gaseous hydrogen tank 104 and the liquefied hydrogen tank 108. In this case, the dischargeable power amount is affected by demand for gaseous hydrogen and demand for liquefied hydrogen. The dischargeable power amount of the hydrogen energy system 10 is also affected by the amount of supply of hot water to the hot water network 90. In addition, discharging of the hydrogen energy system 10 according to the present embodiment means converting hydrogen in the gaseous hydrogen tank 104 into power.

As described above, in charging and discharging of the hydrogen energy system 10, it is necessary to consider not only power but also the amount of heat and the amount of hydrogen. Therefore, it is not always possible to respond to a request for power supply and demand. Accordingly, the hydrogen energy system 10 has constraints such as a chargeable time slot, a dischargeable time slot, a chargeable power amount, and a dischargeable power amount.

Figure 3:
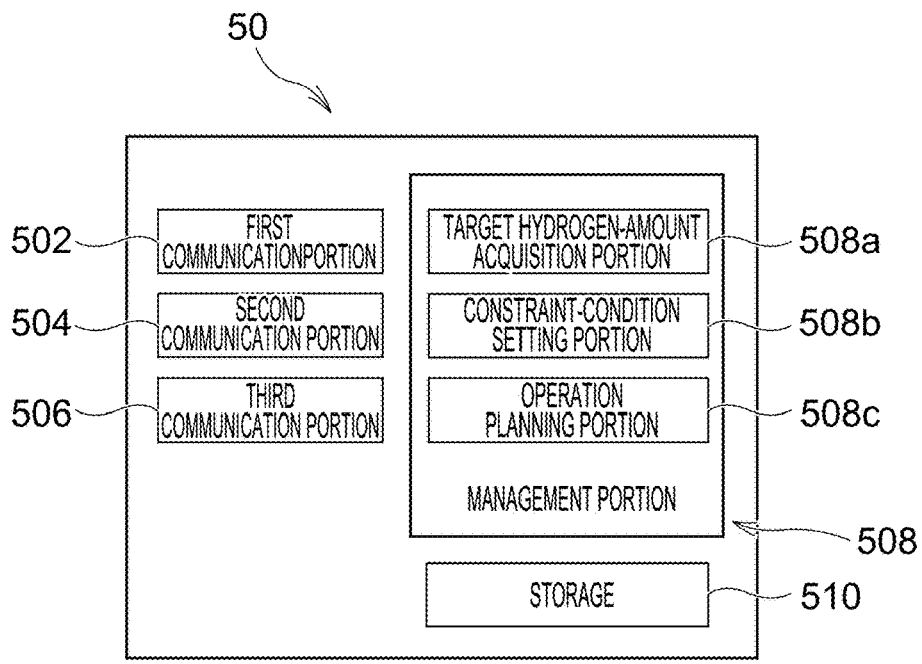
FIG. 3 is a block diagram illustrating a detailed configuration of a hydrogen-energy integrated management system.

FIG. 3 is a block diagram illustrating a detailed configuration of the hydrogen-energy integrated management system 50. As illustrated in FIG. 3, the hydrogen-energy integrated management system 50 includes a first communication portion 502, a second communication portion 504, a third communication portion 506, a management portion 508, and a storage 510.

The first communication portion 502 is a first interface between the power grid control system 20 and the hydrogen-energy integrated management system 50.

The second communication portion 504 is a second interface between the hydrogen transport system 30 and the hydrogen-energy integrated management system 50.

The third communication portion 506 is a third interface between the renewable-energy control system 40 and the hydrogen-energy integrated management system 50. Detailed communication contents of the first communication portion 502, the second communication portion 504, and the third communication portion 506 will be described later.

The management portion 508 is configured to include a CPU (Central Processing Unit), for example, and manages the hydrogen energy system 10, the power grid control system 20, the hydrogen transport system 30, and the renewable-energy control system 40. The management portion 508 includes a target hydrogen-amount acquisition portion 508a, a constraint-condition setting portion 508b, and an operation planning portion 508c.

The target hydrogen-amount acquisition portion 508a acquires a target hydrogen-production amount based on hydrogen demand data transmitted from the hydrogen transport system 30.

The constraint-condition setting portion 508b calculates a time-series hydrogen-system constraint condition for producing the target hydrogen-production amount based on at least the hydrogen-production characteristics or the hydrogen power-generation characteristics of the hydrogen energy system 10.

The operation planning portion 508c creates an operation plan in the hydrogen energy system 10 based on the target hydrogen-production amount acquired by the target hydrogen-amount acquisition portion 508a and data of a charge request transmitted from the power grid control system 20. The details of the target hydrogen-amount acquisition portion 508a, the constraint-condition setting portion 508b, and the operation planning portion 508c will be also described later.

The storage 510 is implemented by a semiconductor memory element such as a RAM (Random Access Memory) or a flash memory, a hard disk, or the like. The storage 510 stores therein a program to be executed by the management portion 508 and various control data.

Detailed communication information of the first communication portion 502, the second communication portion 504, and the third communication portion 506 during normal control is described with reference to FIG. 4.

Figure 4:
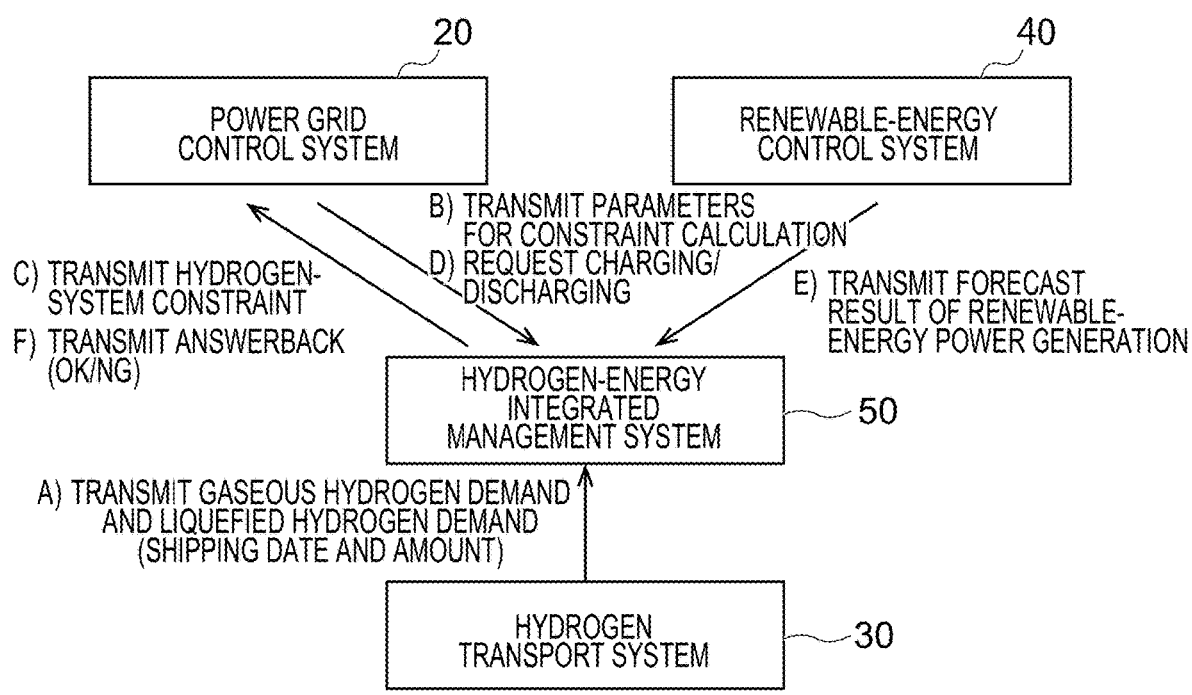
FIG. 4 is a diagram illustrating communication information between systems.

FIG. 4 is a diagram illustrating communication information between the power grid control system 20, the hydrogen transport system 30, the renewable-energy control system 40, and the hydrogen-energy integrated management system 50. These pieces of communication information are information transmitted and received between the systems in advance.

As illustrated in FIG. 4, the first communication portion 502 (FIG. 3) performs communication of at least data of a charge request in charge and discharge requests with the power grid control system 20. More specifically, the first communication portion 502 receives parameters for constraint calculation and charge and discharge requests from the power grid control system 20.

Meanwhile, the first communication portion 502 transmits a hydrogen-system constraint and an answerback (OK/NG) from the hydrogen-energy integrated management system 50 to the power grid control system 20. The parameters for constraint calculation, the charge and discharge requests, the hydrogen-system constraint, and the answerback (OK/NG) are communicated at a predetermined cycle, for example, once a day.

The second communication portion 504 (FIG. 3) performs communication of hydrogen demand data with the hydrogen transport system 30. The hydrogen demand data is communicated at a predetermined cycle, for example, once a week.

The third communication portion 506 (FIG. 3) performs communication of forecast result data of renewable-energy power generation with the renewable-energy control system 40. The forecast result data of renewable-energy power generation is communicated at a predetermined cycle, for example, once a day. Communication information of the first communication portion 502, the second communication portion 504, and the third communication portion 506 during real-time control will be described later.

Here, details of the above-described parameters for constraint calculation are described with reference to FIGS. 5A to 5C. FIG. 5A is a diagram illustrating importance of a discharge time slot in the parameters for constraint calculation. FIG. 5B is a diagram illustrating importance of a charge time slot in the parameters for constraint calculation. FIG. 5C is a diagram illustrating importance of a constraint related to discharging and charging in the parameters for constraint calculation. As illustrated in FIGS. 5A to 5C, the parameters for constraint calculation to be transmitted from the power grid control system 20 to the hydrogen-energy integrated management system 50 include importance of a discharge time slot, importance of a charge time slot, importance of each constraint related to discharging and charging.

As illustrated in FIG. 5A, importance of a discharge time slot is a constraint condition indicating a time slot during which discharging to the power grid 74 is possible by importance. For example, in a case of discharging at 10:00 to 11:59, importance is A, which indicates the corresponding time slot is most desirable. That is, power demand in the power grid 74 is highest at 10:00 to 11:59. The time slot with the second highest importance is a time slot 17:00 to 18:59 having importance B, and the following is a time slot 8:00 to 9:59 having importance C. As can be found from the above description, importance of discharging becomes higher in a time slot in which power demand is high and power shortage occurs.

As illustrated in FIG. 5B, importance of a charge time slot is a constraint condition indicating a time slot during which charging of the hydrogen energy system 10 is possible by importance. For example, in a case of charging at 13:00 to 15:59, importance is A, which indicates the corresponding time slot is most desirable. That is, a time slot in which excessive supply occurs in the power grid 74 is a time slot 13:00 to 15:59. A time slot in which the second most excessive supply occurs is a time slot 16:00 to 16:59 having importance B. As can be found from the above description, importance of charging becomes higher in a time slot in which power demand is low and supply is excessive.

As illustrated in FIG. 5C, importance of a constraint related to discharging and charging is a constraint condition indicating each of a dischargeable time slot, a dischargeable power amount, a chargeable time slot, and a chargeable power amount by importance. It can be found that, for example, in a case where the importance of the dischargeable time slot is 100, the importance of the dischargeable power amount is 20, the importance of the chargeable time slot is 1, and the importance of the chargeable power amount is 2, the importance of the dischargeable time slot is highest, followed by the dischargeable power amount, the chargeable power amount, and the chargeable time slot.

Figure 6:
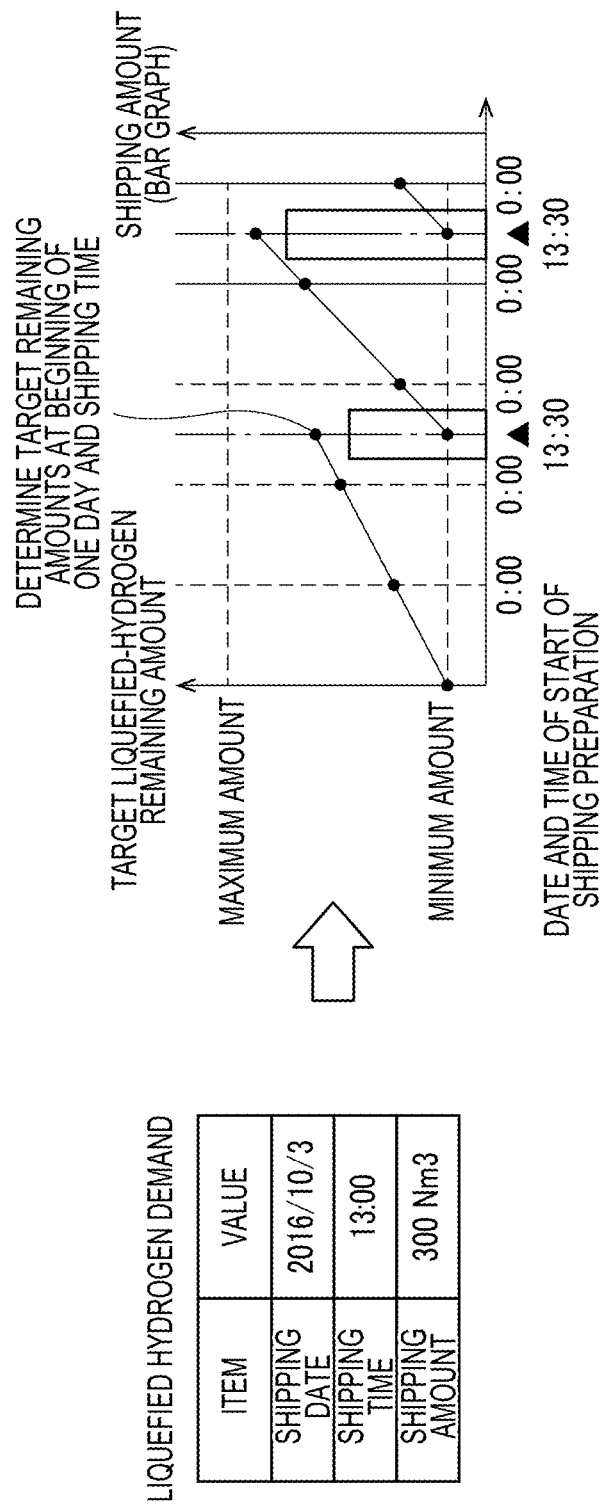
FIG. 6 is a diagram illustrating liquefied hydrogen demand and a processing concept of calculation of a target liquefied-hydrogen remaining amount.

FIG. 6 is a diagram illustrating liquefied hydrogen demand and a processing concept of calculation of a target liquefied-hydrogen remaining amount. The concept of processing by the target hydrogen-amount acquisition portion 508a (FIG. 3) is described with reference to FIG. 6. As illustrated in FIG. 6, the target hydrogen-amount acquisition portion 508a sets a target hydrogen remaining amount of the liquefied hydrogen tank 108 (FIG. 1) at a predetermined time of each day, for example, 0:00 that is the beginning of one day, and a target hydrogen remaining amount at a shipping time based on demand for liquefied hydrogen received by the second communication portion 504 (FIG. 3) from the renewable-energy control system 40, for example. Here, the hydrogen demand includes information on a shipping date, a shipping time, and a shipping amount. The target hydrogen remaining amount is the shipping amount plus a margin amount. This margin amount can be set to any amount. That is, the target hydrogen-amount acquisition portion 508a divides the target liquefied-hydrogen remaining amount at the shipping time by the number of operable days of the hydrogen energy system 10 to acquire the target liquefied-hydrogen remaining amount of the liquefied hydrogen tank 108 (FIG. 1) at the beginning of one day, for example, 0:00.

Similarly, the target hydrogen-amount acquisition portion 508a sets a target hydrogen remaining amount of the gaseous hydrogen tank 104 (FIG. 1) at a predetermined time of each day, for example, 0:00 that is the beginning of one day, and a target hydrogen remaining amount at a shipping time based on demand for gaseous hydrogen received by the second communication portion 504 (FIG. 3) from the renewable-energy control system 40, for example. That is, the target hydrogen-amount acquisition portion 508a divides the target gaseous-hydrogen remaining amount at the shipping time by the number of operable days of the hydrogen energy system 10 to acquire the target gaseous-hydrogen remaining amount of the gaseous hydrogen tank 104 at the beginning of one day, for example, 0:00. A method of setting the target liquefied-hydrogen remaining amount and the target gaseous-hydrogen remaining amount is not limited to the method of performing division by the number of operable days, and these amounts may be set by another method. Further, only one of the target liquefied-hydrogen remaining amount and the target gaseous-hydrogen remaining amount may be set.

Figure 7:
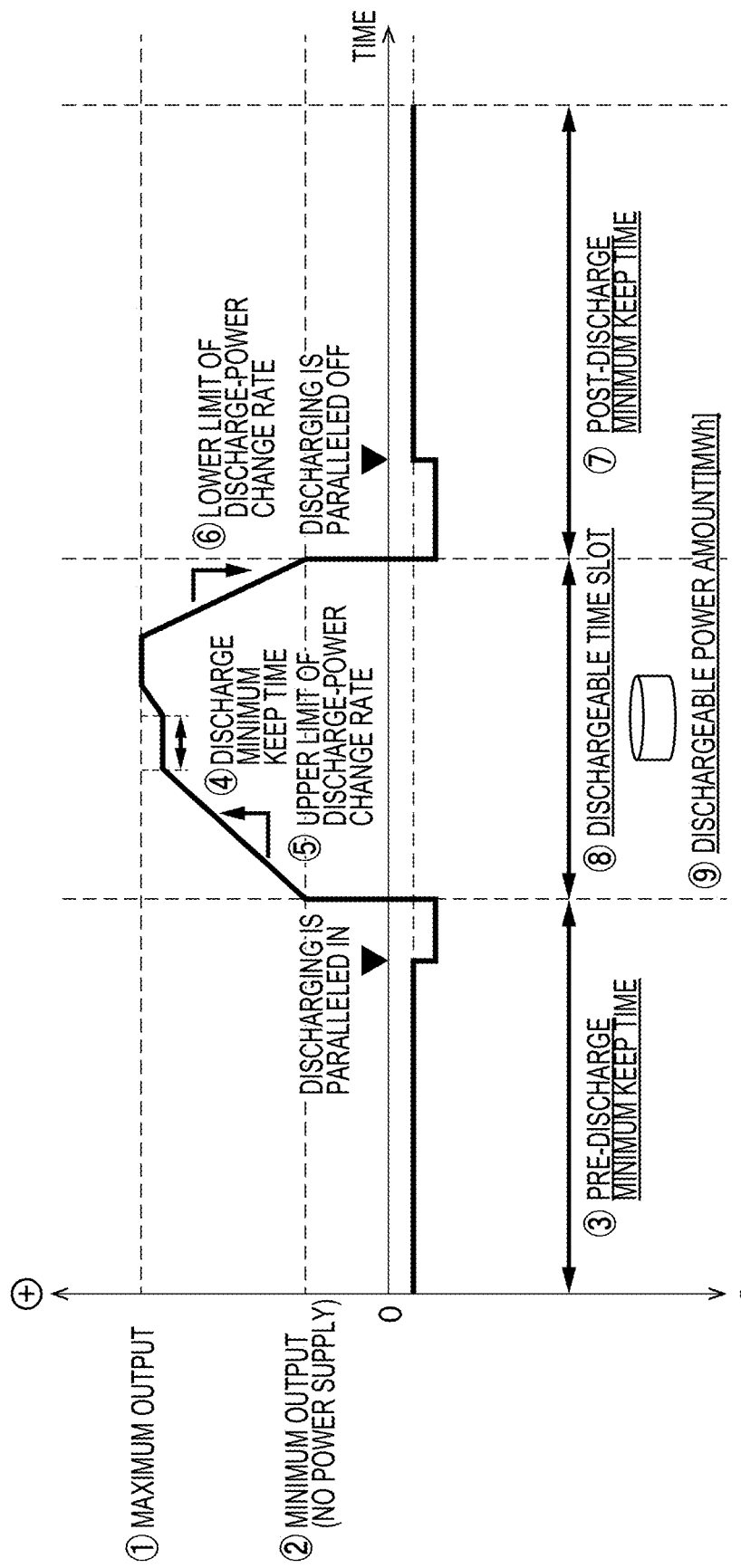
FIG. 7 is a diagram illustrating an example of a hydrogen-system constraint (discharging).

First, a hydrogen-system constraint of the hydrogen energy system 10 during discharging in the constraint-condition setting portion 508b (FIG. 3) is described with reference to FIGS. 7 and 8. FIG. 7 is a diagram illustrating an example of a hydrogen-system constraint (discharging). The positive side of the vertical axis in FIG. 7 indicates discharge power of the hydrogen energy system 10, and the negative side indicates charge power. The horizontal axis indicates elapsed time during a discharge operation. FIG. 8 is a diagram illustrating numerical value examples of a constraint condition used in FIG. 7.

As illustrated in FIG. 7, the constraint-condition setting portion 508b sets, as a constraint condition, dischargeable power with respect to the elapsed time using a target liquefied-hydrogen remaining amount and a target gaseous-hydrogen remaining amount acquired by the target hydrogen-amount acquisition portion 508a and parameters for constraint calculation supplied from the power grid control system 20. A "pre-discharge minimum keep time", a "dischargeable time slot", a "post-discharge minimum keep time", and a "dischargeable power amount", which are underlined, are constraints that are dynamically varied by hydrogen demand or the like.

That is, the "pre-discharge minimum keep time" includes a time to start driving the hydrogen power generator 114

(FIG. 1), and is a time for which the stored amount of hydrogen in the gaseous hydrogen tank 104 (FIG. 1) is taken into consideration, for example. The "dischargeable time slot" is a time slot based on importance of a discharge time slot in the parameters for constraint calculation. The "post-discharge minimum keep time" includes a time to stop driving the hydrogen power generator 114 (FIG. 1), and is a time for which the stored amount of hydrogen in the gaseous hydrogen tank 104 (FIG. 1) is taken into consideration, for example. The "dischargeable power amount" is an amount of power obtained by considering importance of a dischargeable power amount in the parameters for constraint calculation, the stored amount of hydrogen in the gaseous hydrogen tank 104 (FIG. 1), and the like.

Meanwhile, an "upper limit of discharge-power change rate", a "discharge minimum keep time", and a "lower limit of discharge-power change rate" are constraints determined by static specifications of the discharging characteristics in the hydrogen energy system 10. More specifically, they are constraints determined by static specifications of the discharging characteristics in the hydrogen power generator 114 (FIG. 1).

Figure 9:
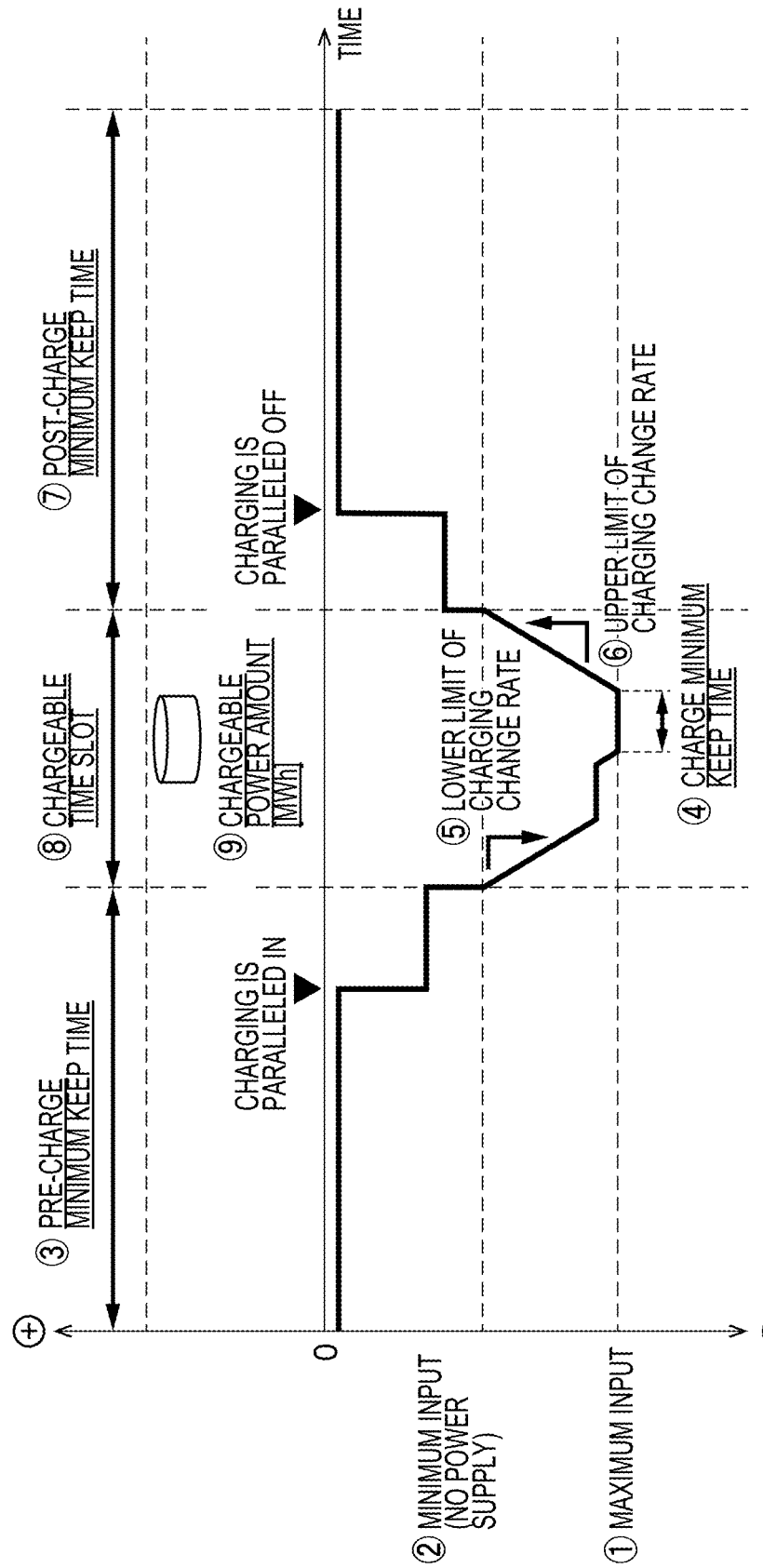
FIG. 9 is a diagram illustrating an example of a hydrogen-system constraint (charging).

Next, a hydrogen-system constraint of the hydrogen energy system 10 during charging in the constraint-condition setting portion 508b (FIG. 3) is described with reference to FIGS. 9 and 10. FIG. 9 is a diagram illustrating an example of a hydrogen-system constraint (charging). The positive side of the vertical axis in FIG. 9 indicates discharge power of the hydrogen energy system 10, and the negative side indicates charge power. The horizontal axis indicates elapsed time during a 11 operation. FIG. 10 is a diagram illustrating numerical value examples of a constraint condition used in FIG. 9.

As illustrated in FIG. 9, the constraint-condition setting portion 508b sets, as a constraint condition, chargeable power with respect to the elapsed time using a target liquefied-hydrogen remaining amount and a target gaseous-hydrogen remaining amount acquired by the target hydrogen-amount acquisition portion 508a and parameters for constraint calculation supplied from the power grid control system 20. A "pre-charge minimum keep time", a "chargeable time slot", a "post-charge minimum keep time", and a "chargeable power amount", which are underlined, are constraints that are dynamically varied by hydrogen demand or the like.

That is, the "pre-charge minimum keep time" can be obtained based on, for example, the operating state of the hydrogen production device 102 (FIG. 1) or the state of the remaining amount in the gaseous hydrogen tank 104. The "chargeable time slot" is a time slot based on importance of a charge time slot in the parameters for constraint calculation. The "post-charge minimum keep time" includes a time to stop driving the hydrogen production device 102 (FIG. 1), and is a time for which the stored amount of hydrogen in the gaseous hydrogen tank 104 (FIG. 1) is taken into consideration, for example. The "chargeable power amount" is an amount of power obtained by considering importance of a chargeable power amount in the parameters for constraint calculation, the stored amount of hydrogen in the gaseous hydrogen tank 104 (FIG. 1), and the like.

Meanwhile, a "lower limit of charging change rate", a "discharge minimum keep time", and an "upper limit of charging change rate" are constraints determined by static specifications of the charging characteristics in the hydrogen energy system 10. More specifically, the "lower limit of charging change rate", the "discharge minimum keep time", and the "upper limit of charging change rate" are constraints determined by static specifications of the charging characteristics in the hydrogen production device 102 (FIG. 1).

FIG. 11 is a diagram illustrating an example of charge and discharge requests from the power grid control system 20. As illustrated in FIG. 11, the power grid control system 20 plans times-series charge and discharge requests based on the hydrogen-system constraint set by the constraint-condition setting portion 508b. The charge and discharge requests include a plurality of discharge requests that are different from each other in a time slot and a discharge amount and a plurality of charge requests that are different from each other in a time slot and a charge amount. That is, the power grid control system 20 can have a plurality of discharge requests and a plurality of charge requests. For example, the power grid control system 20 requests any of the charge requests to the hydrogen-energy integrated management system 50 via the second communication portion 504 in advance, with regard to a charge time slot in which power supply of the power grid 74 exceeds demand. Accordingly, it is possible to supply power to the hydrogen energy system 10 in accordance with the supply state of the power grid 74. Although the unit is MW in this example, it may be MWh. The charge and discharge requests may be demand responses.

FIG. 12 is a diagram illustrating an example of data of forecast results of renewable-energy power generation in the renewable-energy control system 40. As illustrated in FIG. 12, the renewable-energy control system 40 transmits time-series data of forecast results of renewable-energy power generation to the hydrogen-energy integrated management system 50.

FIG. 13 is a diagram illustrating an example of an answerback (OK/NG) based on an operation plan by the operation planning portion 508c (FIG. 3). As illustrated in FIG. 13, the operation planning portion 508c makes a time-series plan of charge and discharge power based on charge and discharge requests from the power grid control system 20 and forecast results of renewable-energy power generation of the renewable-energy control system 40. The hydrogen-energy integrated management system 50 then transmits a signal including information of OK as an answerback to the power grid control system 20 when it is possible to respond to a charge or discharge request from the power grid control system 20. Meanwhile, the hydrogen-energy integrated management system 50 transmits a signal including NG as an answerback and information on the amount of power shortage to the power grid control system 20 when it is impossible to respond to the charge or discharge request from the power grid control system 20. The operation planning unit 508c may make an operation plan for the next day on the previous day, or may make a long-term operation plan, for example, an operation plan for several weeks, several months, or several years if long-term data is available with regard to hydrogen demand and a forecast of renewable-energy power generation.

Figure 14:
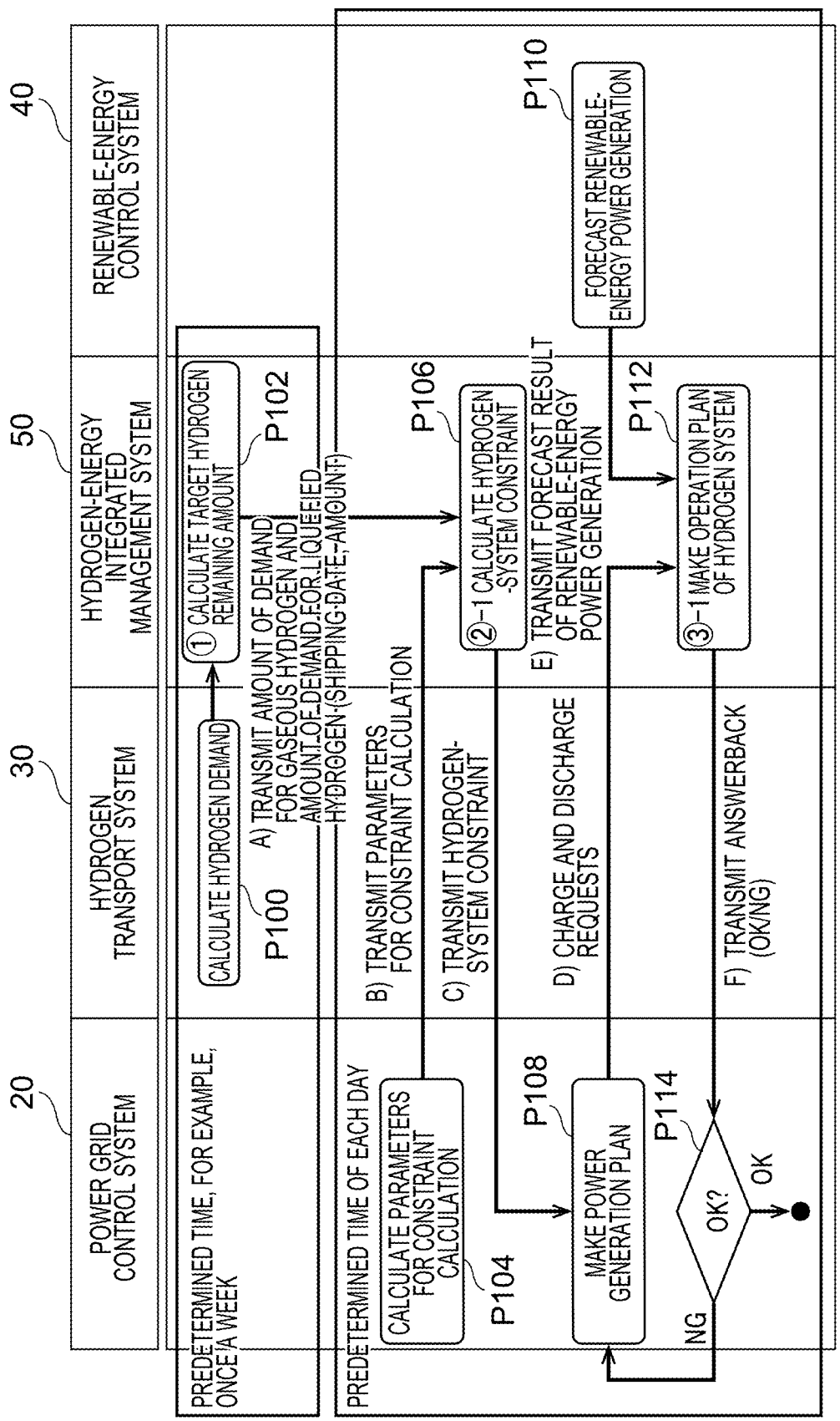
FIG. 14 is a diagram illustrating a protocol of data and a flow of processing.

FIG. 14 is a diagram illustrating a protocol of data transmitted and received between systems in advance and a flow of processing. As illustrated in FIG. 14, the hydrogen transport system 30 transmits the amount of demand for gaseous hydrogen, the amount of demand for liquefied hydrogen, and a shipping date and time to the hydrogen-energy integrated management system 50 via the second communication portion 504 (a protocol P100).

Next, the target hydrogen-amount acquisition portion 508a of the hydrogen-energy integrated management system 50 sets a target hydrogen remaining amount of the liquefied hydrogen tank 108 at a predetermined time of each day and a target hydrogen remaining amount at a shipping time based on the amount of demand for gaseous hydrogen and the amount of demand for liquefied hydrogen (a protocol P102). Further, the power grid control system 20 calculates parameters for constraint calculation and transmits them to the hydrogen-energy integrated management system 50 (a protocol P104).

Next, the constraint-condition setting portion 508b of the hydrogen-energy integrated management system 50 calculates and sets a time-series hydrogen-system constraint of the hydrogen energy system 10 using the parameters for constraint calculation and the target hydrogen remaining amounts (a protocol P106). Subsequently, the constraint-condition setting portion 508b transmits the calculated hydrogen-system constraint to the power grid control system 20.

Next, the power grid control system 20 plans time-series charge and discharge requests using the hydrogen-system constraint and transmits them to the operation planning portion 508c of the hydrogen-energy integrated management system 50 (a protocol P108). Further, the renewable-energy control system 40 transmits forecast results of renewable-energy power generation to the operation planning portion 508c of the hydrogen-energy integrated management system 50 (a protocol P110).

Next, the operation planning portion 508c creates an operation plan of the hydrogen energy system 10 based on the time-series charge and discharge requests and the forecast results of renewable-energy power generation, and transmits an answerback to the power grid control system 20 (a protocol P112).

Next, the power grid control system 20 determines whether the answerback is OK at all times (a protocol P114). If all the answerbacks are OK (OK in the protocol P114), control is executed in accordance with the operation plan made in the protocol P108. On the other hand, when an answerback NG is included (NG in the protocol P114), the processing from the protocol P108 including change of the operation plan is repeated. The operation planning portion 508c may hold the answerback until a predetermined time elapses when creation of the operation plan fails, and may perform the answerback after an answer condition is satisfied. The reason is as follows. Before the predetermined time elapses, the forecast result of renewable-energy power generation may be changed and all of the operation plans may become OK. In this case, there is a possibility that processing efficiency as a whole increases when the operation planning portion 508c waits for the predetermined time rather than when it repeats the processing from the protocol P202 including the change of the operation plan.

Figure 15:
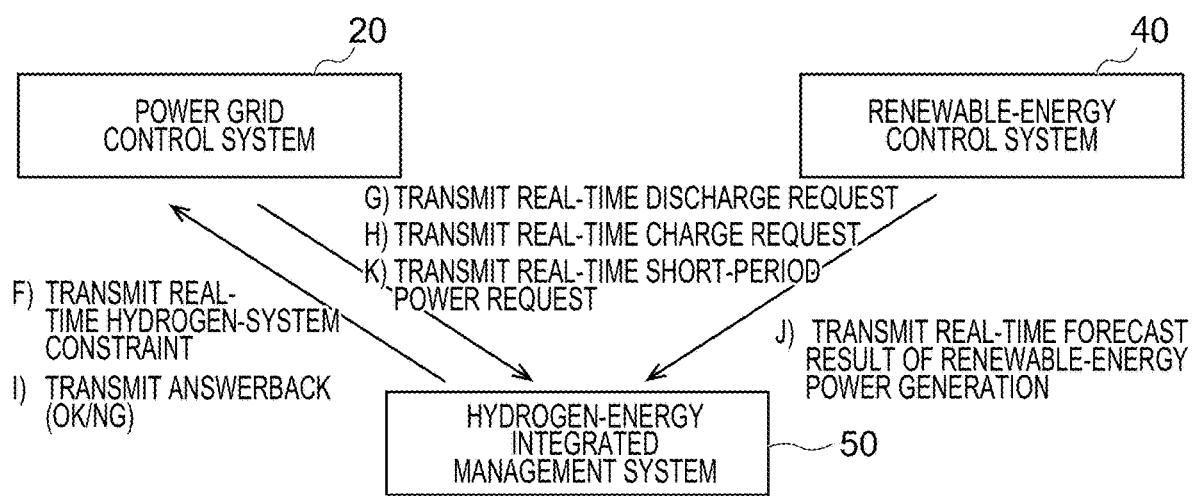
FIG. 15 is a diagram illustrating an example of data transmitted and received between systems in real time.

Next, data transmitted and received between systems in real time is described with reference to FIG. 15. FIG. 15 is a diagram illustrating an example of data transmitted and received between systems in real time. As illustrated in FIG. 15, the first communication portion 502 (FIG. 3) receives a real-time discharge request, a real-time charge request, and a real-time short-period power request from the power grid control system 20. Here, a relation of a period Ta>a period Td is established, and the period Ta is on the order of several minutes, for example. The real-time discharge request and the real-time charge request are request signals with the period Ta, and the real-time short-period power request is a request signal with the period Td.

FIG. 16A is a diagram illustrating an example of a real-time discharge request. FIG. 16B is a diagram illustrating an example of a real-time charge request.

Further, the first communication portion 502 (FIG. 3) transmits a real-time hydrogen-system constraint and a real-time answerback (OK/NG) from the hydrogen-energy integrated management system 50 to the power grid control system 20. The real-time hydrogen-system constraint and the real-time answerback (OK/NG) are transmission signals with the period Ta.

FIG. 16C is a diagram illustrating an example of a reactive power request of a real-time short-period power request. FIG. 16D is a diagram illustrating a different example of a reactive power request of a real-time short-period power request. FIG. 16E is a diagram illustrating an example of an LFC (load frequency control) request of a real-time short-period power request. As illustrated in FIGS. 16C to 16E, the real-time short-period power request indicates a short-period power request for Td minutes after Td minutes, for example. The reactive power request may be a pair of active power and reactive power as illustrated in FIG. 16C or may be a pair of a power factor and reactive power as illustrated in FIG. 16D.

As described above, the real-time short-period power request is a reactive power request for stabilizing a voltage of a system or an LFC that is a short-period request for stabilizing the frequency, for example. With regard to these requests, there is a possibility that calculation of a constraint or an operation plan is not completed in time. Therefore, only check is performed for these requests whether it is possible to respond to a request. If it is impossible to respond to the request, the request is not processed. Therefore, in the period Td, the real-time hydrogen-system constraint and the real-time answerback (OK/NG) are not transmitted to the power grid control system 20 in some cases.

As illustrated in FIG. 15, the third communication portion 506 (FIG. 3) receives a real-time forecast result of renewable-energy power generation from the renewable-energy control system 40. The real-time forecast result of renewable-energy power generation is received by communication with the period Ta.

Figure 17:
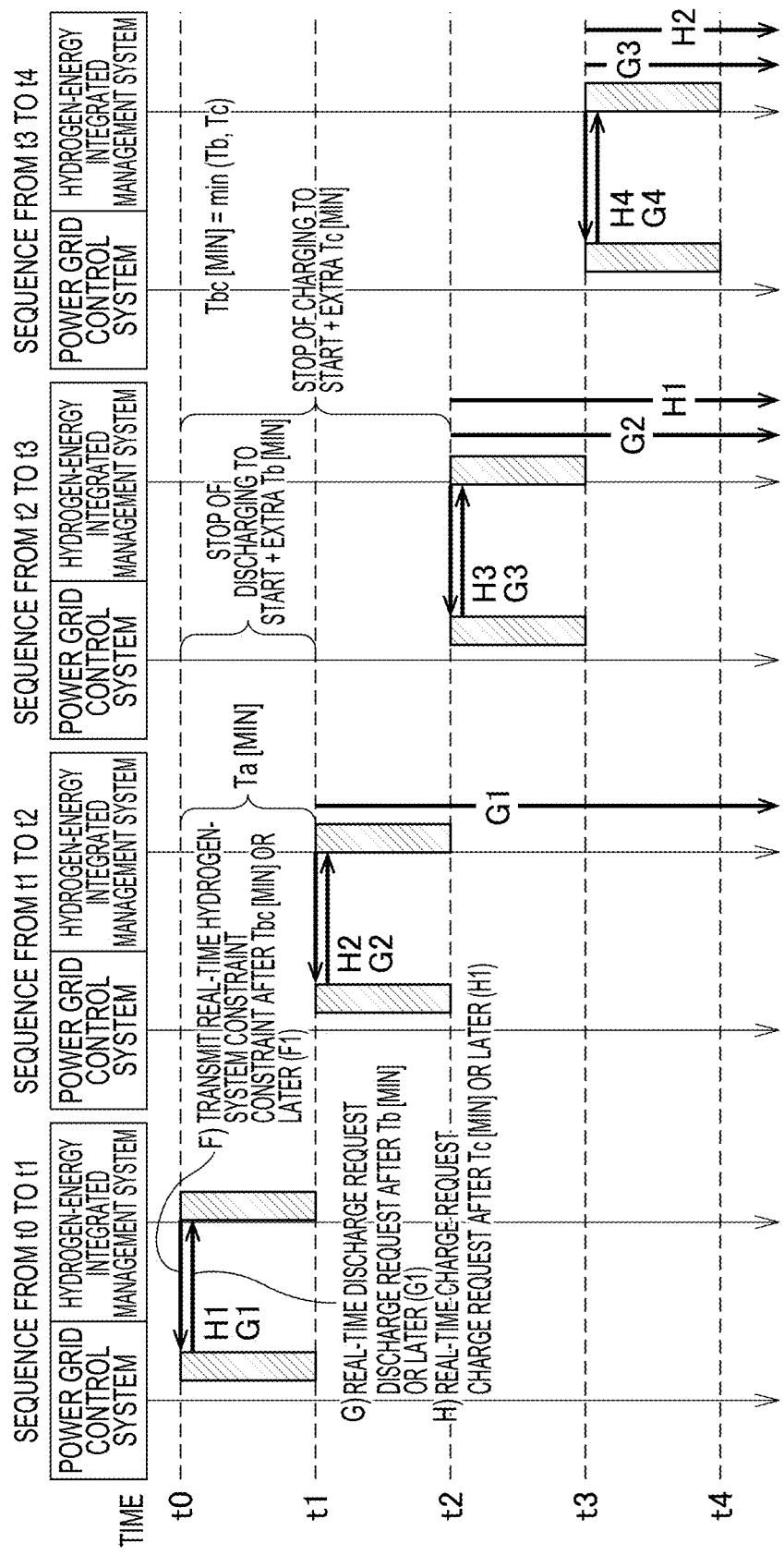
FIG. 17 is a diagram illustrating a sequence example of real-time processing.

FIG. 17 is a diagram illustrating a sequence example of real-time processing. Here, it is assumed that a processing cycle is Ta minutes. Ta is any value. That is, each of the intervals between t0 and t1, t1 and t2, t2 and t3, and t3 and t4 is Ta minutes. Further, it is assumed that a time obtained by adding an extra time to a time from a stop state to a power-generation possible state in order for the hydrogen power generator 114 to generate power is Tb minutes. Furthermore, it is assumed that a time obtained by adding an extra time to a time from a stop state to a production possible state in order for a hydrogen production device to perform charging is Tc minutes. The smaller one of Tb and Tc is assumed as Tbc.

A real-time hydrogen system constraint represents a constraint after Tbc minutes or later. For example, a real-time hydrogen-system constraint transmitted to the power grid control system 20 at time t0 is set as a constraint at time t0+Tbc minutes or later. When calculating a real-time constraint, the constraint-condition setting portion 508b (FIG. 3) calculates and sets a real-time hydrogen-system constraint using an actual hydrogen-production result, a renewable-energy power generation result, a discharge request after the present time, and a charge request after the present time. For example, a real-time discharge request before Tb minutes is used as the discharge request after the present time, and a real-time charge request before Tc minutes is used for the charge request after the present time. Meanwhile, as the real-time discharge request, a request after Tb minutes is performed. As the real-time charge request, a request after Tc minutes is performed. The real-time forecast result of renewable-energy power generation is identical to a forecast result of renewable-energy power generation, but is a forecast result after the present time.

Figure 18:
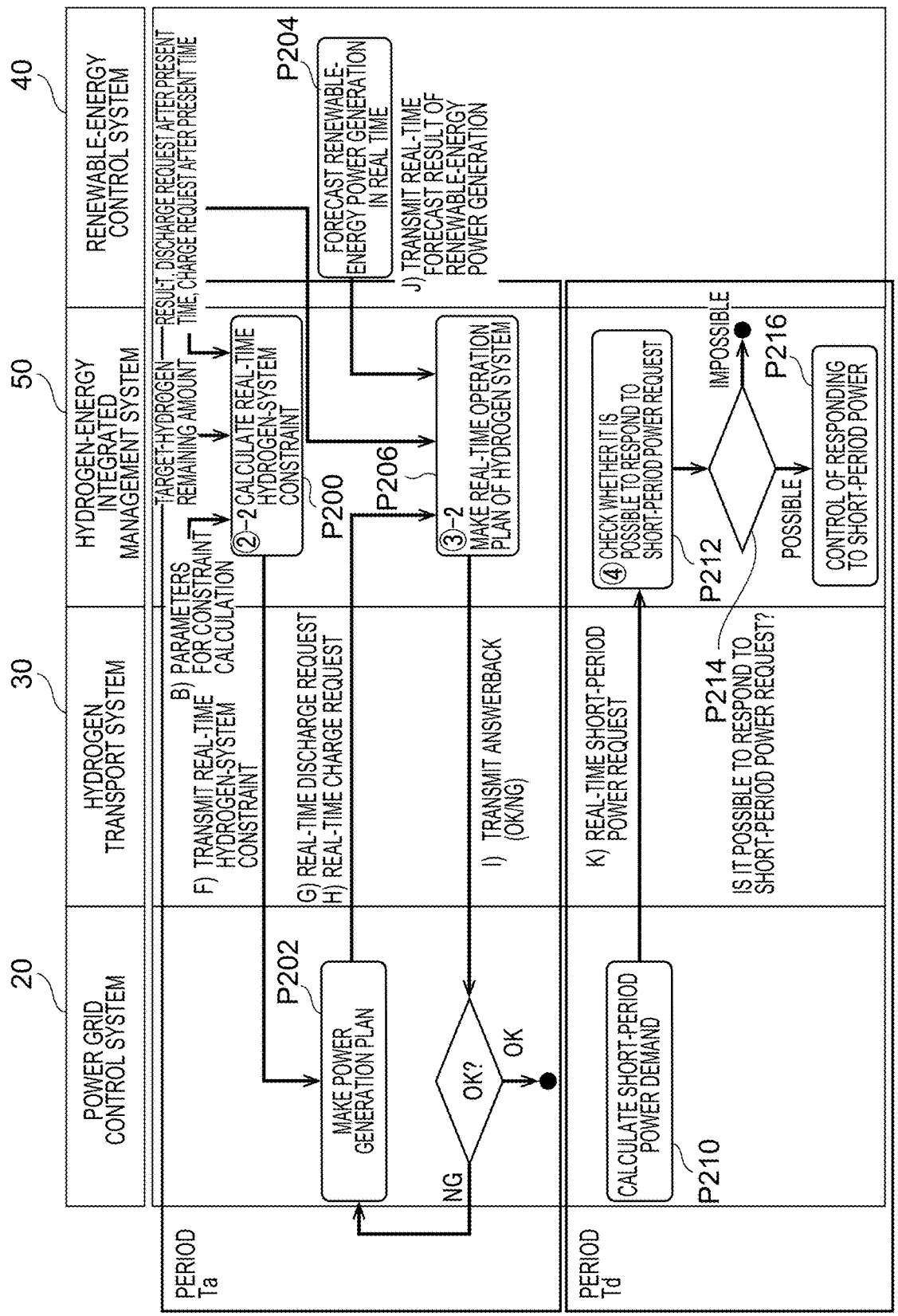
FIG. 18 is a diagram illustrating a protocol of data transmitted and received between systems in real time and a flow of processing.

FIG. 18 is a diagram illustrating a protocol of data transmitted and received between systems in real time and a flow of processing. Here, a protocol of real-time processing in a case of the period Ta is described first, and then a protocol of real-time processing in a case of the period Td is described.

In the case of the period Ta, first, the constraint-condition setting portion 508b of the hydrogen-energy integrated management system 50 calculates and sets a real-time hydrogen-system constraint using parameters for constraint calculation, a target hydrogen remaining amount, and a charge request and a discharge request after the present time (a protocol P200). Subsequently, the constraint-condition setting portion 508b transmits the calculated real-time hydrogen-system constraint to the power grid control system 20.

Next, the power grid control system 20 plans real-time charge and discharge requests using the real-time hydrogen-system constraint and transmits the real-time charge request and the real-time discharge request to the operation planning portion 508c of the hydrogen-energy integrated management system 50 (a protocol P202). Further, the renewable-energy control system 40 transmits a real-time forecast result of renewable-energy power generation to the operation planning portion 508c of the hydrogen-energy integrated management system 50 (a protocol P204).

Next, the operation planning portion 508c creates a real-time operation plan of the hydrogen energy system 10 based on the real-time charge and discharge requests and the real-time forecast result of renewable-energy power generation, and transmits an answerback to the power grid control system 20 (a protocol P206). In this manner, the operation planning portion 508c further creates an operation plan with a shorter period than the operation plan (FIG. 14).

Next, the power grid control system 20 determines whether the answerback is OK at all times (a protocol P208). If all the answerbacks are OK (OK in the protocol P208), real-time control is executed in accordance with the power generation plan made in the protocol P202. On the other hand, when an answerback NG is included (NG in the protocol P208), the processing from the protocol P202 including change of the operation plan is repeated. The operation planning portion 508c may hold the answerback until a predetermined time elapses when creation of the operation plan fails, and may perform the answerback after an answer condition is satisfied. The reason is as follows. Before the predetermined time elapses, the real-time forecast result of renewable-energy power generation may be changed and all of the operation plans may become OK. In this case, there is a possibility that processing efficiency as a whole increases when the operation planning portion 508c waits for the predetermined time rather than when it repeats the processing from the protocol P202 including the change of the operation plan.

In the case of the period Td, the power grid control system 20 calculates short-period power demand and transmits it to the operation planning portion 508c of the hydrogen-energy integrated management system 50 (a protocol P210). The operation planning unit 508c checks a short-period power request from the power grid control system 20 (a protocol P212) and determines whether it is possible to respond to that request (a protocol P214). When it is possible to respond to that request (possible in the protocol P214), the power grid control system 20 executes control of responding to short-period power (a protocol P216). Meanwhile, when it is impossible to respond to that request (impossible in the protocol P214), the control is put on hold to wait until a predetermined time elapses.

As described above, according to the present embodiment, the target hydrogen-amount acquisition portion 508a of the hydrogen-energy integrated management system 50 is configured to acquire a target hydrogen-production amount based on hydrogen demand data of the hydrogen transport system 30, and the operation planning portion 508c of the hydrogen-energy integrated management system 50 creates an operation plan in the hydrogen energy system 10 based on the target hydrogen-production amount and data of a charge request of the power grid control system 20. Accordingly, it is possible to adjust independent request processes of the power grid control system 20 and the hydrogen transport system 30 by control based on the operation plan of the hydrogen energy system 10, also in a case where the power grid control system 20 and the hydrogen transport system 30 execute control independently of each other.

First Modification of Embodiment

A first modification of the embodiment is different from the embodiment in further including a display controller 512 that causes a monitor to display the operation state of the hydrogen energy system 10. Differences between the first modification and the embodiment are described below.

Figure 19:
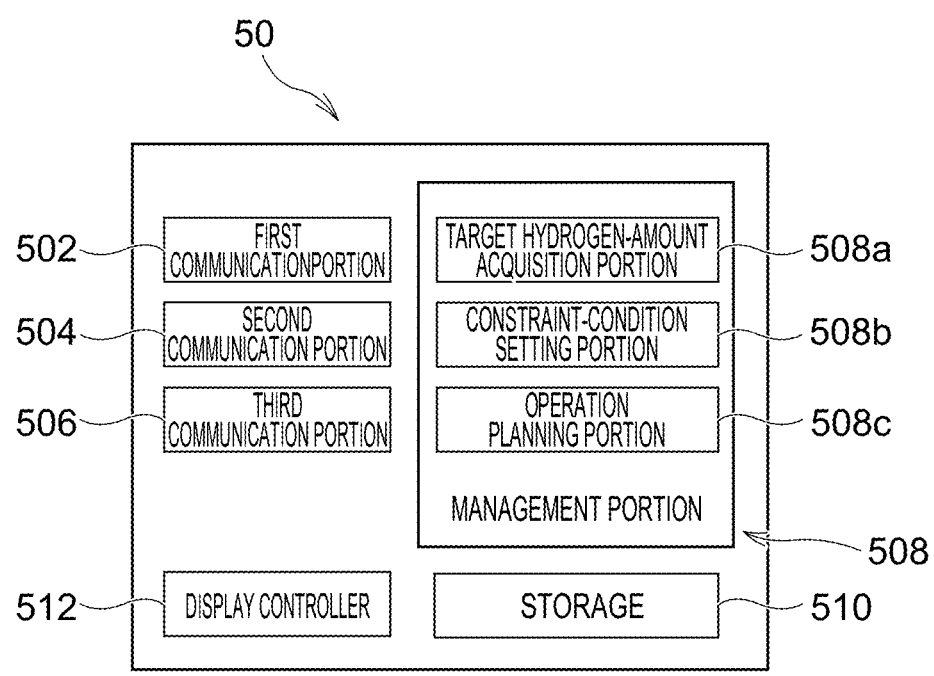
FIG. 19 is a block diagram illustrating a detailed configuration of a hydrogen-energy integrated management system according to a first modification of an embodiment.

FIG. 19 is a block diagram illustrating a detailed configuration of the hydrogen-energy integrated management system 50 according to the first modification of the embodiment. As illustrated in FIG. 19, the hydrogen-energy integrated management system 50 is different from that in the embodiment in including the display controller 512.

The display controller 512 executes display control that causes a display, for example, a monitor to display the operation state of the hydrogen energy system 10.

Figure 20:
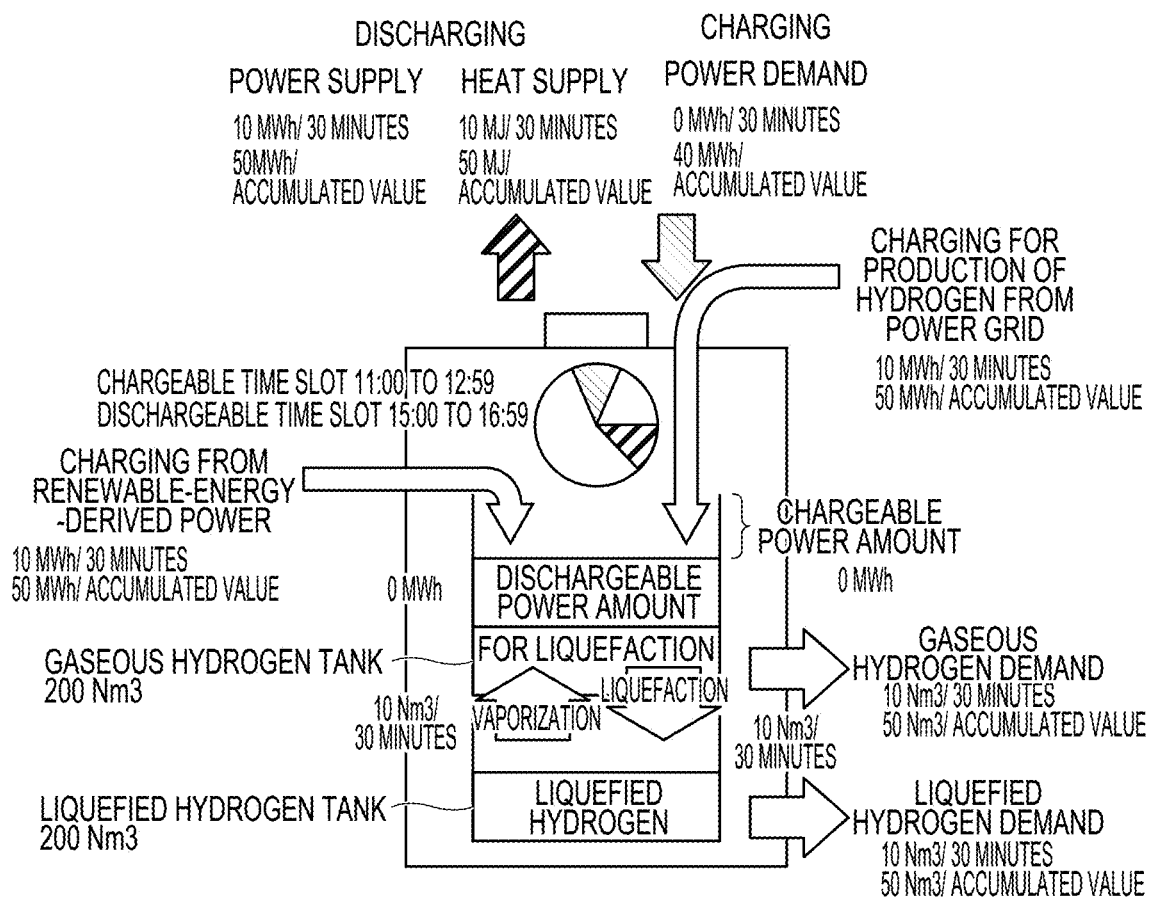
FIG. 20 is a diagram illustrating an example of a display screen of a charge or discharge state of a hydrogen energy system.

FIG. 20 is a diagram illustrating an example of a display screen of a charge or discharge state of the hydrogen energy system 10. As illustrated in FIG. 20, the display controller 512 displays a screen on a monitor together with numerical values indicating the charge or discharge state of the hydrogen energy system 10.

Figure 21:
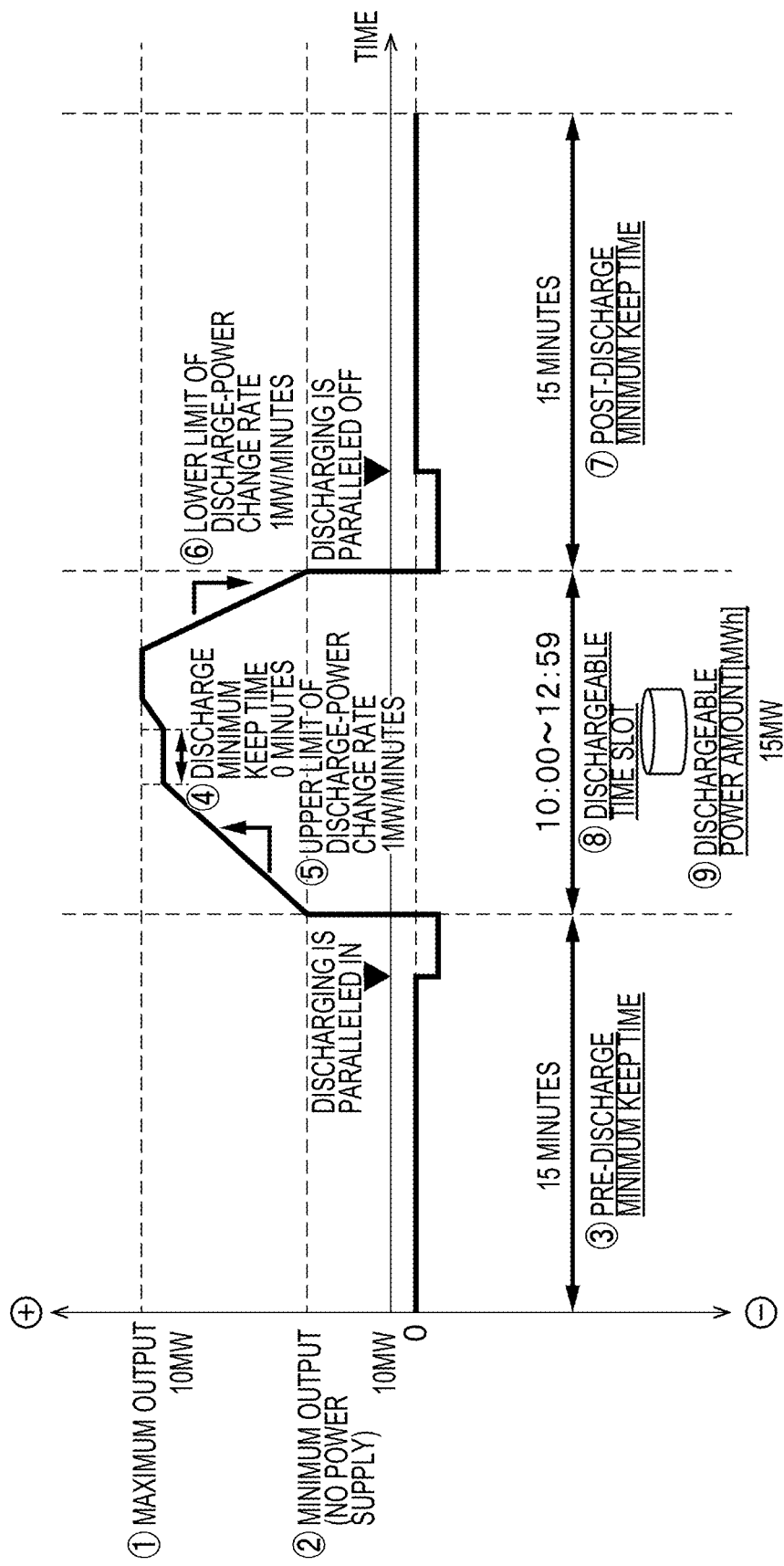
FIG. 21 is a diagram illustrating an example of a display screen of a constraint of the hydrogen energy system.

FIG. 21 is a diagram illustrating an example of a display screen of a constraint of the hydrogen energy system 10. As illustrated in FIG. 21, the display controller 512 displays a screen on a monitor together with numerical values indicating the constraint of the hydrogen energy system 10 during discharging. In this case, the display controller 512 can also change the numerical values by input processing of an operation portion. The display controller 512 can display an equivalent screen also during charging.

As described above, according to the first modification of the embodiment, a display screen of a charge or discharge state is caused to be displayed on a monitor, thereby making it easy to understand the state and to find a defect. Further, by displaying the display screen on the monitor together with numerical values indicating a constraint during discharging, it becomes easy to understand a constraint state during discharging, and it also becomes possible to reduce setting errors.

Second Modification of Embodiment

A second modification of the embodiment is different from the embodiment in that the hydrogen energy system 10 further includes a storage battery 116 and a heat storage tank 118. Differences between the second modification and the embodiment are described below.

Figure 22:
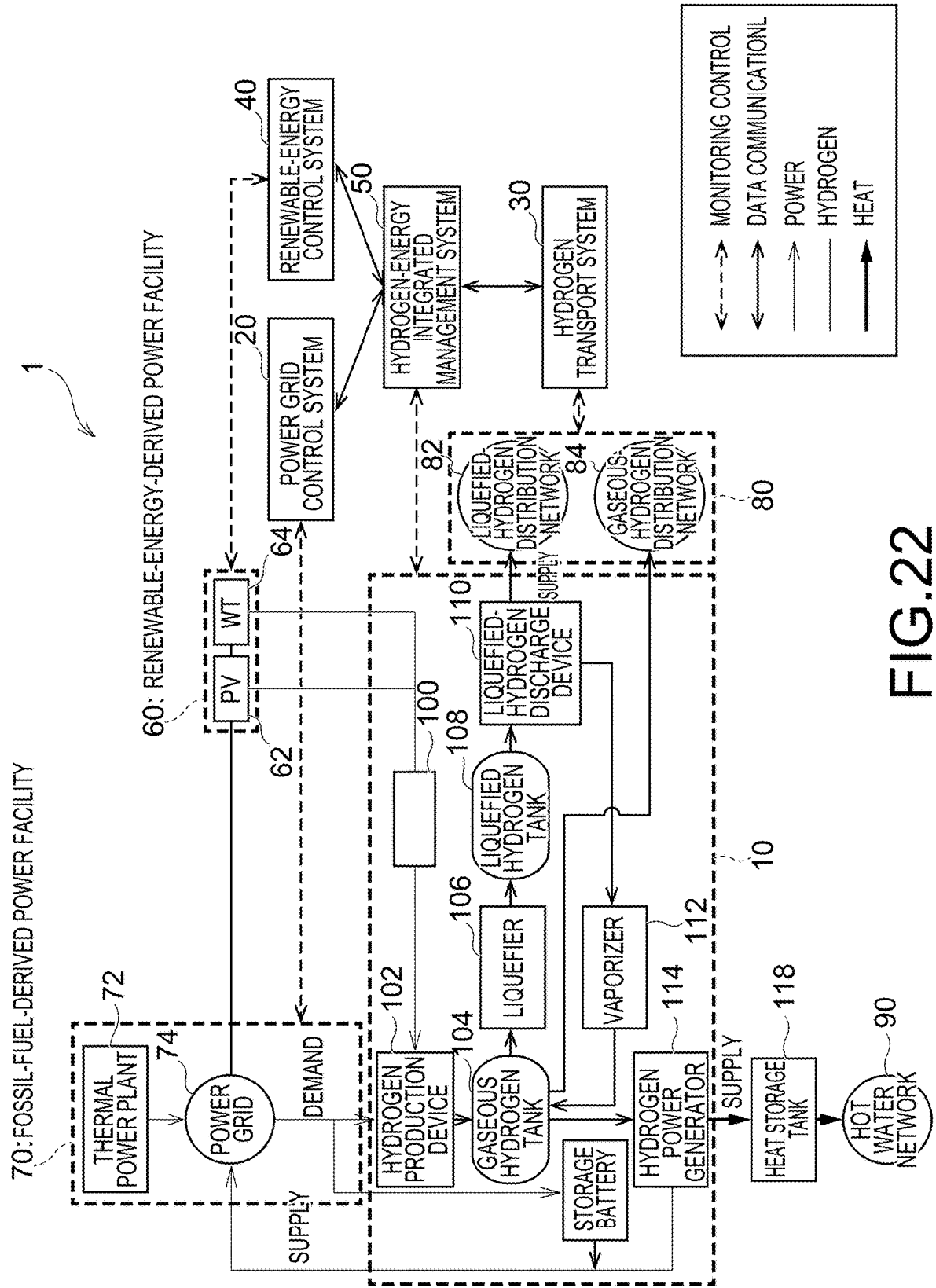
FIG. 22 is a block diagram illustrating a detailed configuration of a hydrogen energy system according to a second modification of the embodiment.

FIG. 22 is a block diagram illustrating a detailed configuration of the hydrogen energy system 10 according to the second modification of the embodiment. As illustrated in FIG. 22, the hydrogen energy system 10 is different from that in the embodiment in including the storage battery 116 and the heat storage tank 118.

The storage battery 116 supplements power supply to the power grid 74 when power generated by the hydrogen power generator 114 is insufficient. Therefore, it is possible to perform power supply of the hydrogen power generator 114 more stably. Further, the storage battery 116 can effectively use renewable energy or the like, because it has a higher response speed than the hydrogen power generator 114.

The heat storage tank 118 stores therein heat of the hydrogen power generator 114.

As described above, according to the second modification of the embodiment, the hydrogen energy system 10 includes the storage battery 116, and it is therefore possible to effectively use renewable energy or the like and to reduce power consumption in the entire hydrogen energy system 10. Further, since the hydrogen energy system 10 includes the heat storage tank 118, it is possible to supply heat discharged from the hydrogen power generator 114 in accordance with a time during which heat can be used.

While certain embodiments have been described, these embodiments have been presented by way of example only, and are not intended to limit the scope of the inventions. Indeed, the novel device, the method, and the program described herein may be embodied in a variety of other forms and various omissions, substitutions, and changes may be made without departing from the spirit of the inventions.

The invention claimed is:

1. A hydrogen-energy control system comprising:
a hydrogen energy system configured to produce at least hydrogen by power;
a power grid control system configured to make a power generation plan of a power facility that supplies power to a power grid;
a hydrogen transport system configured to manage hydrogen transport; and
a hydrogen-energy integrated management system configured to control the hydrogen energy system based on the power grid control system and information on communication with the power grid control system, wherein
the hydrogen-energy integrated management system includes
a first communication portion configured to perform communication of at least data of a charge request in charge and discharge requests with the power grid control system,
a second communication portion configured to perform communication of hydrogen demand data with the hydrogen transport system,
a target hydrogen-amount acquisition portion configured to acquire a target hydrogen-production amount based on the hydrogen demand data, and
an operation planning portion configured to create an operation plan in the hydrogen energy system based on the target hydrogen-production amount and the data of the charge request,
wherein the operation planning portion transmits, as an answerback, information including at least any one of:
a start time and an end time of charging or discharging of the hydrogen energy system,
success or failure of the operation plan, and
power to which the hydrogen energy system is not able to respond.

2. The system of claim 1, wherein
the power grid control system has a plurality of charge requests, and
requests any one of the charge requests to the hydrogen-energy integrated management system via the second communication portion in advance with regard to a charge time slot in which power supply of the power grid exceeds demand, and
the operation planning portion plans a hydrogen production process corresponding to the any one of the charge requests in the charge time slot.

3. The system of claim 1, further comprising a renewable-energy control system configured to control power generation using renewable energy, wherein
the hydrogen-energy integrated management system further includes a third communication portion configured to perform communication of forecast result data of renewable-energy power generation with the renewable-energy control system, and
the operation planning portion creates the operation plan in the hydrogen energy system also based on the forecast result data of renewable-energy power generation.

4. The system of claim 1, wherein
the hydrogen-energy integrated management system further includes a constraint-condition calculation portion configured to calculate a time-series hydrogen-system constraint condition for producing the target hydrogen-production amount based on at least hydrogen-production characteristics of the hydrogen energy system, and
the power grid control system plans time-series charge and discharge requests based on the time-series hydrogen-system constraint condition.

5. The system of claim 4, wherein
parameters for constraint calculation include a start time and an end time of a discharge time slot in which discharging from the hydrogen system to a system is to be performed, importance of the discharge time slot, a start time and an end time of a charge time slot in which charging from the system to the hydrogen system is to be performed, importance of the charge time slot, a dischargeable time slot, importance of the dischargeable time slot, a dischargeable power amount, importance of the dischargeable power amount, a chargeable time slot, importance of the chargeable time slot, a chargeable power amount, and importance of the chargeable power amount, and
the constraint-condition calculation portion calculates, as the time-series hydrogen-system constraint condition, at least any one of;
a pre-discharge minimum keep time,
the dischargeable time slot,
a post-discharge minimum keep time,
the dischargeable power amount,
a pre-charge minimum keep time,
the chargeable time slot,
a post-charge minimum keep time, and
the chargeable power amount.

6. The system of claim 1, wherein
the hydrogen demand data includes at least one of a shipping date, a shipping time, and a shipping amount, and the target hydrogen-production amount corresponds to a target remaining amount in a hydrogen tank included in the hydrogen energy system and is a target remaining amount with regard to at least either one of a predetermined time of one day and the shipping time.

7. The system of claim 1, wherein, when creation of the operation plan fails, the operation planning portion accepts charge and discharge requests from the power grid control system again and creates an operation plan.

8. The system of claim 1, wherein, when creation of the operation plan fails, the operation planning portion holds an answerback until a predetermined time elapses, and transmits the answerback after an answer condition is satisfied.

9. The system of claim 1, wherein
the hydrogen energy system includes
a hydrogen production device configured to produce the hydrogen,
a gaseous hydrogen tank configured to store therein the hydrogen as a gas,
a gaseous-hydrogen discharge device configured to extract gaseous hydrogen from the gaseous hydrogen tank to outside, and
a hydrogen power generator configured to generate power and heat from the hydrogen.

10. The system of claim 1, wherein the operation planning portion further creates a shorter-period operation plan than the operation plan.

11. The system of claim 1, wherein the operation planning portion creates a real-time operation plan in the hydrogen energy system with respect to real-time charge and discharge requests of the power grid control system.

12. The system claim 1, further comprising a display controller configured to cause a display to display at least either one of a display screen of a charging or discharging state and a display screen for constraint setting.

13. The system of claim 1, wherein the hydrogen energy system includes at least either one of a storage battery and a heat storage tank.

14. A control method for a hydrogen-energy control system that includes
a hydrogen energy system configured to produce at least hydrogen by power,
a power grid control system configured to make a power generation plan of a power facility that supplies power to a power grid,
a hydrogen transport system configured to manage hydrogen transport, and
a hydrogen-energy integrated management system configured to control the hydrogen energy system based on the power grid control system and information on communication with the power grid control system, wherein
the hydrogen-energy integrated management system includes
a first communication portion configured to perform communication of at least data of a charge request in charge and discharge requests with the power grid control system, and
a second communication portion configured to perform communication of hydrogen demand data with the hydrogen transport system, the method comprising:
a target hydrogen-amount acquisition step of acquiring a target hydrogen-production amount based on the hydrogen demand data, and
an operation planning step of creating an operation plan in the hydrogen energy system based on the target hydrogen-production amount and the data of the charge request, and
a transmitting step of transmitting, as an answerback, information including at least one of:
a start time and an end time of charging or discharging of the hydrogen energy system,
success or failure of the operation plan, or
power to which the hydrogen energy system is not able to respond.

* * * * *

UNITED STATES PATENT AND TRADEMARK OFFICE
CERTIFICATE OF CORRECTION

PATENT NO. : 11,784,335 B2
APPLICATION NO. : 17/345924
DATED : October 10, 2023
INVENTOR(S) : Takashi Akiba et al.

Page 1 of 1

It is certified that error appears in the above-identified patent and that said Letters Patent is hereby corrected as shown below:

In the Claims

Claim 5, Column 16, Line 55, "at least any one of;" should read --at least any one of:--.

Signed and Sealed this
Seventh Day of November, 2023

Katherine Kelly Vidal
*Director of the United States Patent and Trademark Office*